(12) United States Patent
Anumala et al.

(10) Patent No.: US 10,965,759 B2
(45) Date of Patent: Mar. 30, 2021

(54) SYSTEM AND METHOD OF INTERNET OF THINGS (IOT)

(71) Applicant: RELIANCE JIO INFOCOMM LIMITED, Maharashtra (IN)

(72) Inventors: Hariprasad Anumala, Karnataka (IN); Basha Mahaboob, Karnataka (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/560,356

(22) Filed: Sep. 4, 2019

(65) Prior Publication Data
US 2020/0076896 A1 Mar. 5, 2020

(30) Foreign Application Priority Data
Sep. 4, 2018 (IN) .............................. 201821033175

(51) Int. Cl.
*H04L 29/08* (2006.01)
*H04W 4/70* (2018.01)
*H04W 60/04* (2009.01)
*H04L 29/06* (2006.01)
*H04L 12/28* (2006.01)

(52) U.S. Cl.
CPC .............. *H04L 67/12* (2013.01); *H04L 12/28* (2013.01); *H04L 65/1073* (2013.01); *H04W 4/70* (2018.02); *H04W 60/04* (2013.01)

(58) Field of Classification Search
CPC ..... H04L 67/12; H04L 67/10; H04L 63/0823; H04L 67/125; H04L 12/28; H04L 12/2807; H04L 12/2856; H04L 65/1073; H04W 4/70; H04W 84/12; H04W 12/06
See application file for complete search history.

(56) References Cited

U.S. PATENT DOCUMENTS

| | | | |
|---|---|---|---|
| 2016/0212099 A1* | 7/2016 | Zou | H04L 63/0263 |
| 2018/0199386 A1* | 7/2018 | Yuan | H04L 67/125 |
| 2019/0058586 A1* | 2/2019 | Kumar | H04L 9/0861 |
| 2019/0069162 A1* | 2/2019 | Lindheimer | H04L 63/0876 |
| 2019/0158355 A1* | 5/2019 | Ramisetty | H04L 67/34 |
| 2019/0268338 A1* | 8/2019 | Patil | H04L 63/0869 |
| 2020/0067938 A1* | 2/2020 | Smith | G06F 9/5072 |

* cited by examiner

*Primary Examiner* — Chirag R Patel
(74) *Attorney, Agent, or Firm* — Hunton Andrews Kurth LLP

(57) ABSTRACT

Embodiments of the present disclosure relate to systems and methods for automatically provisioning at least one new IoT device to at least one IoT gateway via a wireless network, comprising: dynamically receiving at least one new device model of at least one new IoT device at an onboarding server. Upon successfully connecting with the at least one IoT gateway, the onboarding server dynamically pushes the at least one new device model to the IoT gateway. Subsequently, when a new first IoT device tries to connect with the at least one IoT gateway, the IoT gateway processes the received registration request to identify a device model associated with the first IoT device, and thereafter provisions a connection with the first IoT device.

20 Claims, 9 Drawing Sheets

SYSTEM AND METHOD OF INTERNET OF THINGS (IOT)

CROSS REFERENCE TO RELATED APPLICATIONS

This application claims priority to Indian Patent Application No. 201821033175, filed Sep. 4, 2018, the disclosure of which is hereby incorporated by reference in its entirety.

FIELD OF THE INVENTION

Embodiments of the present disclosure generally relate to wireless communication. In particular, embodiments of the present disclosure relate to automatic provisioning and/or onboarding of internet of thing (IoT) devices seamlessly via a wireless network.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With the "Internet of things" (referred hereafter as "IoT") concept getting prevalent these days, devices used in day-to-day activities such as coffee makers, electric switches, washing machines, headphones, lamps etc. are also being increasingly looked upon as potential IoT devices. Advancements in licensed networks (for e.g. GMS, EDGE, HSPA, LTE) and unlicensed networks (Wi-Fi, UMA, DECT, Bluetooth, Zigbee, RFID) of various wireless technologies enables wireless network operators to provide communication services to multiple user devices by sharing network resources available in both the licensed network and in the unlicensed network. And therefore, device onboarding is one of the major challenges in hub-based IoT platform deployments.

Currently available solutions rely on static and closed sensors models definition, and accordingly operate on pre-defined device models defined by the IoT cloud and aligned with the sensors and gateways implementations. Typically, the IoT platform provides lists of all sensors supported by the platform and then the user is asked to choose from the list of published sensors. One such use case is smart home deployment where the user buys a fixed set of sensors and home gateway wherein the system expects that sensors supporting the same connectivity standards will seamlessly work. Also, if new sensors are to be added to the platform, both the gateways and mobile apps need an upgrade which is a major overhead as adding new sensors always requires firmware upgrade on the gateway devices. There is also a frequent down-time of IoT gateways which breaks the user experience.

Other existing approach that is commonly available today is based on setting up or onboarding a first Internet of Things (IoT) device that has limited or no interfacing capability itself to connect to a network through a second IoT device in communication with the network, by sending a request to a second device in communication with the network and receiving permission to initiate communication with the network. However, this approach requires the support of additional communication interface on IoT devices so that the IoT device seeking onboarding to the server communicates with another IoT device which is already on board on the Wi-Fi network.

Another alternative approach relies on using a device model in the IoT gateway application that includes one or more device types and corresponding device-specific message type definitions corresponding to the one or more device types are identified, select one or more devices that are registered to communicate structured data associated with the registered one or more devices via the Internet based on the device-specific message type definitions. Yet another alternative approach relies on onboarding of Wi-Fi enabled internet of thing (IoT) devices to a wireless network, served by one or more wireless access points, by pushing configuration details via access point. The configuration settings only deal with Wi-Fi devices and do not deal with ZigBee and other sensor interfaces. However, both these approach do not provide a technique to provision generic device at the Gateway in the cloud without disruption and also do not provide seamless software update on the Gateways to support new sensor types with upgrade on server platform with zero downtime of Gateways with uninterrupted device usage and control.

Therefore, in view of the above shortcomings in the existing approaches, there is a need in the art to provide a solution that ensures easy and smooth onboarding of the IoT devices and techniques to provision generic devices at the gateway via the cloud without disruption and provide seamless software update on the gateways to support new sensor types with upgrade on server platform with zero downtime of gateways and with uninterrupted device usage and control.

SUMMARY

This section is provided to introduce certain objects and aspects of the present disclosure in a simplified form that are further described below in the detailed description. This summary is not intended to identify the key features or the scope of the claimed subject matter. In order to overcome at least a few problems associated with the known solutions as provided in the previous section, an object of the present disclosure is to provide a method and system to automatically provision IoT devices over a secure Gateway in the cloud without disruption through a plurality of Gateway wireless Access Points. Another object of the present disclosure is to provide the system and method to add any new models on the fly on the cloud side without doing the firmware upgrade of gateway device. Yet another object of the present disclosure is to provide a system and a method to reduce upgrade time that is required to support new models of sensors/IoT devices. Yet another object of the present disclosure is to provide a system and a method to provide a novel mechanism to ensure secure onboarding of IoT devices without any sort of Wi-Fi configuration user interface(s). Yet another object of the present disclosure is to provide a system and a method to provide an efficient and effective novel mechanism to facilitate secure onboarding of IoT devices with Gateway as the only communication interface. Yet another object of the present disclosure is to provide a system and a method to provide seamless software update on the Gateways to support new IoT device types with upgrade on server platform. Yet another object of the present disclosure is to provide a system and a method to provide onboarding of IoT devices with zero downtime of Gateways and uninterrupted device usage and control. Yet another object of the present disclosure is to provide a system and a method to provide a scalable method to manage the onboarding of large number of IoT devices. Yet another object of the present disclosure is to provide a system and a method to provide a novel method to restrict the onboarding of IoT devices to a plurality of Gateway sharing the same network identifier. Yet another object of the present disclosure is to provide a system and a method to provide users with the features and ability to receive seamless services simultaneously or sequentially, on IoT devices with the Gateway without any latency. Yet another object of the present disclosure is to provide a system and a method to provide features and ability to handle high volume of configurations concurrently at the Gateway. Yet another object of the present disclosure is to provide a system and a method to not expose the user with difficulties of technicalities of upgrades and notifications of new sensors models on the gateway.

In order to achieve at least some of the above-mentioned objectives, a first aspect of the present disclosure relates to a method for automatically provisioning at least one new IoT device to at least one IoT gateway via a wireless network, wherein the method begins with dynamically receiving at least one new device model of at least one new IoT device at an onboarding server, wherein the new device model comprises of a configuration setting and a model identifier corresponding to the at least one new IoT device. Subsequently, a connection request is received, at the onboarding server, from the at least one IoT gateway via the wireless network, in response to which, a connection is established between the at least one IoT gateway and the onboarding server via the wireless network. Further, the onboarding server dynamically pushes the at least one new device model to the at least one IoT gateway based on a successful connection between the at least one IoT gateway and the onboarding server. Subsequently, a registration request is received from a first IoT device at the at least one IoT gateway via the wireless network, wherein the registration request comprises a model identifier of the first IoT device. Further, the at least one IoT gateway processes the received registration request to identify a configuration setting associated with said first IoT device based on the model identifier of the first IoT device. Thereafter, the at least one IoT gateway provisions a permanent connection between the at least one IoT gateway and the first IoT device using the identified configuration setting of the first IoT device.

Another aspect of the present disclosure relates to a system for automatically provisioning at least one new IoT device to at least one IoT gateway over at least one wireless network. The system comprises an onboarding server, at least one IoT gateway, and a wireless network. The onboarding server further comprises a first memory unit, a device capability management server, and a first device provisioning module. The device capability management server is connected to the first memory unit. The device capability management server is configured to dynamically receive at least one new device model via an admin console, wherein the new device model comprises a configuration setting and a model identifier corresponding to the at least one new IoT device. The first device provisioning module is connected to the first memory unit and the device capability management server. The first device provisioning module is configured to receive a connection request from the at least one IoT gateway via the wireless network. The first device provisioning module is further configured to establish a connection with the at least one IoT gateway via the wireless network. The first device provisioning module is further configured to dynamically push the at least one new device model to the at least one IoT gateway based on a successful connection with the at least one IoT gateway. The at least one IoT gateway comprises a second memory unit, a communication processor, a second device provisioning module and a device discovery manager. The communication processor is connected to the second memory unit. The communication processor is configured to transmit a connection request to the onboarding server via the wireless network. The communication processor is further configured to establish a connection with the onboarding server via the wireless network. The second device provisioning module is connected to the second memory unit and the communication processor. The second device provisioning module is configured to dynamically receive the at least one new device model from the onboarding server based on a successful connection with the onboarding server. The device discovery manager is connected to the second memory unit, the communication processor and the second device provisioning module. The device discovery manager is configured to receive a registration request from a first IoT device via the wireless network, wherein the registration request comprises a model identifier of the first IoT device. The device discovery manager is further configured to process the received registration request to identify a configuration setting associated with said first IoT device based on the model identifier of the first IoT device. The device discovery manager is further configured to provision a permanent connection between the at least one IoT gateway and the first IoT device using the identified configuration setting of the first IoT device.

Yet another aspect of the present disclosure relates to a method for automatically provisioning at least one new IoT device to at least one IoT gateway via a wireless network, the method being performed by an onboarding server, wherein the method begins with dynamically receiving at least one new device model of at least one new IoT device, wherein the new device model comprises of a configuration setting and a model identifier corresponding to the at least one new IoT device. Subsequently, a connection request is received from the at least one IoT gateway via the wireless network. Next, a connection is established between the at least one IoT gateway and the onboarding server via the wireless network. Thereafter, the onboarding server dynamically pushes the at least one new device model to the at least one IoT gateway based on a successful connection between the at least one IoT gateway and the onboarding server.

Yet another aspect of the present disclosure relates to an onboarding server for automatically provisioning at least one new IoT device to at least one IoT gateway via a wireless network. The onboarding server comprises a first memory unit, a device capability management server, and a first device provisioning module. The device capability management server is connected to the first memory unit. The device capability management server is configured to dynamically receive at least one new device model via an admin console, wherein the new device model comprises a configuration setting and a model identifier corresponding to the at least one new IoT device. The first device provisioning module is connected to the first memory unit and the device capability management server. The first device provisioning module is configured to receive a connection request from the at least one IoT gateway via the wireless network. The first device provisioning module is further configured to establish a connection with the at least one IoT gateway via the wireless network. The first device provisioning module is further configured to dynamically push the at least one new device model to the at least one IoT gateway based on a successful connection with the at least one IoT gateway.

Yet another aspect of the present disclosure relates to a method for automatically provisioning at least one new IoT device to at least one IoT gateway via a wireless network, the method being performed by the at least one IoT gateway, wherein the method begins with transmitting a connection request to an onboarding server via the wireless network. Next, a connection is established between the at least one IoT gateway and the onboarding server via the wireless network. Further, the at least one IoT gateway dynamically receives at least one new device model of at least one new IoT device from the onboarding server, wherein the new device model comprises of a configuration setting and a model identifier corresponding to the at least one new IoT device. Subsequently, a registration request is received from a first IoT device via the wireless network, wherein the registration request comprises a model identifier of the first IoT device. Further, the received registration request is processed to identify a configuration setting associated with said first IoT device based on the model identifier of the first IoT device. Thereafter, the at least one IoT gateway provisions a permanent connection with the first IoT device using the identified configuration setting of the first IoT device.

Yet another aspect of the present disclosure relates to an IoT gateway for automatically provisioning with at least one new IoT device over a wireless network. The IoT gateway comprises a second memory unit, a communication processor, a second device provisioning module and a device discovery manager. The communication processor is connected to the second memory unit. The communication processor is configured to transmit a connection request to the onboarding server via the wireless network. The communication processor is further configured to establish a connection with the onboarding server via the wireless network. The second device provisioning module is connected to the second memory unit and the communication processor. The second device provisioning module is configured to dynamically receive the at least one new device model from the onboarding server based on a successful connection with the onboarding server. The device discovery manager is connected to the second memory unit, the communication processor and the second device provisioning module. The device discovery manager is configured to receive a registration request from a first IoT device via the wireless network, wherein the registration request comprises a model identifier of the first IoT device. The device discovery manager is further configured to process the received registration request to identify a configuration setting associated with said first IoT device based on the model identifier of the first IoT device. The device discovery manager is further configured to provision a permanent connection with the first IoT device using the identified configuration setting of the first IoT device.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the disclosure, but the possible variants of the method and system according to the disclosure are illustrated herein to highlight the advantages of the invention. It will be appreciated by those skilled in the art that disclosure of such drawings includes disclosure of electrical components or circuitry commonly used to implement such components.

Figure 1:
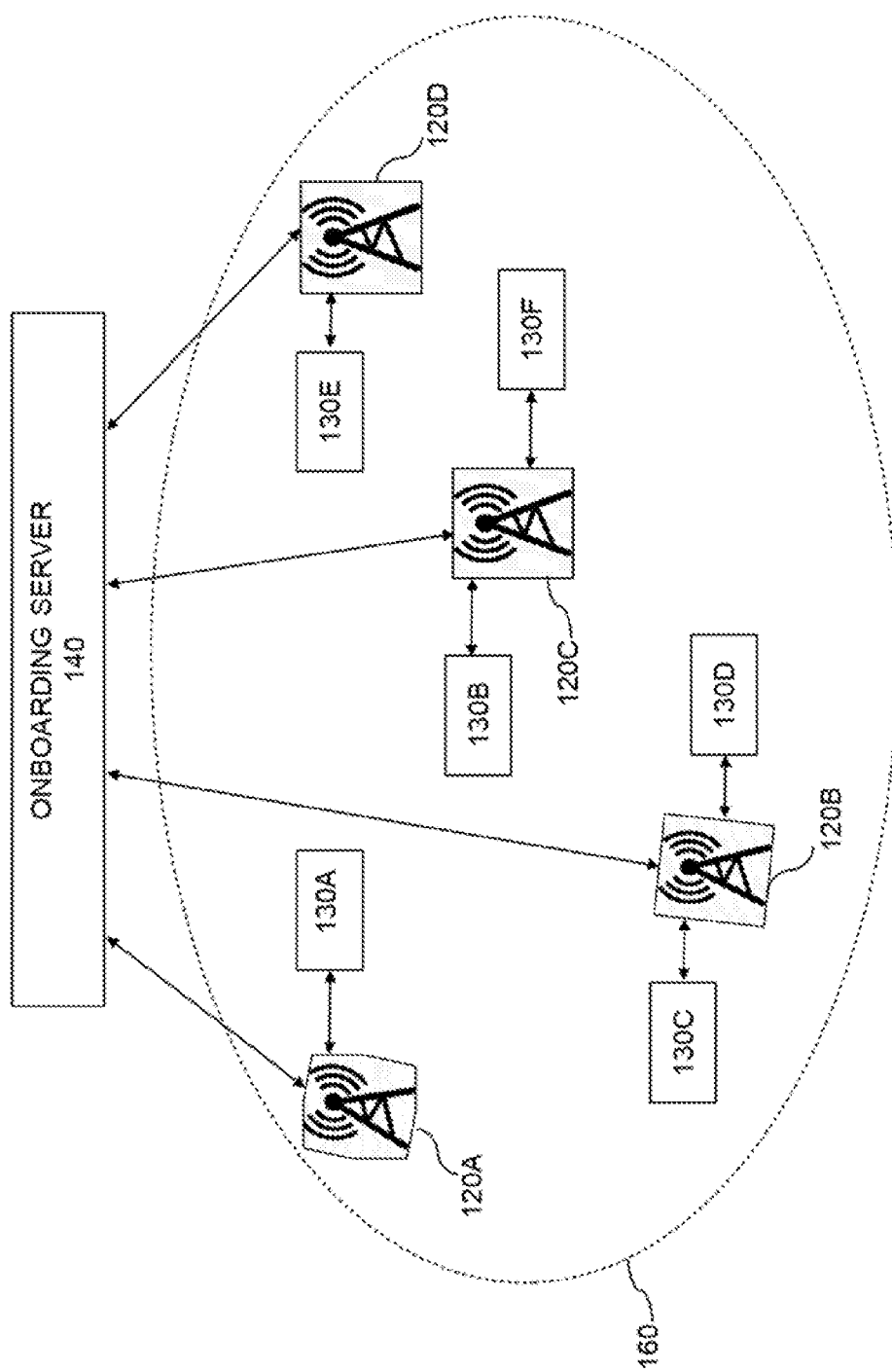
FIG. 1 illustrates an overall system [100] for automatically provisioning a new IoT device to an IoT gateway via a wireless network, in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

As used herein, the "IoT device" refers to any electrical, electronic, electromechanical and computing device. The IoT device is capable of receiving and/or transmitting one or parameters, performing function/s, communicating with other IoT devices as well as non-IoT devices and transmitting data to the devices. The IoT device may have at least a processor, a display, a memory, a battery and an input means such as a hard keypad and/or a soft keypad. The at least one IoT device may include, but is not limited to, a thermostat, an electric switch, a washing machine, a computing device, a coffee maker, a refrigerator, a headphone, a lamp, a room sensor, a microwave, a fan, a light and any such device that is obvious to a person skilled in the art. IoT devices may be capable of operating on any radio access technology including but not limited to IP-enabled communication, Zig Bee, Bluetooth, Bluetooth Low Energy, Near Field Communication, Z-Wave, etc.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "controller" or "control unit" includes one or more controllers, wherein the controller refers to any logic circuitry for processing instructions. A controller may be a general-purpose controller, a special-purpose controller, a conventional controller, a digital signal controller, a plurality of microcontrollers, one or more microcontrollers in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor.

As used herein, "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

Systems depicted in some of the figures may be provided in various configurations. In some embodiments, the systems may be configured as a distributed system where one or more components of the system are distributed across one or more networks in a cloud computing system.

The present disclosure provides a system and a method for automatically provisioning at least one new IoT device to at least one IoT gateway via a wireless network. The present invention attempts to define generic device models and solve the problem of adding new IoT devices (sensors) seamlessly at the onboarding server without disrupting users who are already using the currently connected IoT devices. The present invention also encompasses that a new IoT device model added seamlessly also integrates with the currently connected IoT devices, and that new rules are generated with a combination of currently connected IoT devices as well as new IoT devices. Accordingly, a user receives new IoT actions on his mobile interface as and when new IoT devices are added to the user account.

Referring to FIG. 1, an architecture of an overall system [100] for automatically provisioning at least one new IoT device to at least one IoT gateway via a wireless network, in accordance with an embodiment of the present disclosure, the system [100] comprising: an onboarding server [140], at least one IoT gateway [120A, 120B, 120C, 120D, collectively referred to as "120" ] providing a wireless network [160], and at least one IoT device [130A, 130B, 130C, 130D, 130E, 130F, collectively referred to as "130" ].

The at least one IoT gateway [120] may serve the wireless network [160] to the at least one IoT device [130]. Further, the at least one IoT device [130] may be capable to connect and communicate with the at least one IoT gateway [120] via the wireless network [140]. The onboarding server [140] may be capable of communicating with the at least one IoT gateway [120] and the at least one IoT device [130] over the wireless network [160].

As used herein, the at least one IoT gateway [120] serves a wireless network [160] to the at least one IoT device [130], wherein the at least one IoT gateway [120] serves the at least one IoT device [130] using a connection established between said at least one IoT device [130] and said at least one IoT gateway [120] via the wireless network [160].

As used herein, the wireless network [160] is capable of providing one of a long-range and short-range wireless communication between the at least one IoT device [130], the at least one IoT gateway [120] and the onboarding server [140]. Further, the wireless network is operable at a variable wireless frequency band such as 2.4 GHz and 5 GHz.

As used herein, the "configuration setting" of the at least one new IoT device [130] includes, but not limited to, a service set identifier of the IoT device [130], a password/pass-phrase and a combination thereof. Further, the configuration setting for each of the IoT devices [130] may be generated/created by the onboarding server [110]. Moreover, the configuration setting of the IoT device [130] may be stored in the memory of the IoT device [130] after the onboarding server [110] generates/creates the configuration setting.

As used herein, the "identifier" may refer to a numeric or alphanumeric string that is used for identifying the IoT device [130]. The unique identifier may include, but not limited to, a media access control (MAC) address, a vendor identifier and any such identifier obvious to a person skilled in the art.

As used herein, the word "on-boarding" may refer to a status of the IoT device [130] maintained at the onboarding server [140] and may represent that the IoT device [130] has a prior communication with the onboarding server [110].

As used herein, the "registration request" from the IoT device [130] may refer to a status of the IoT device [130] maintained at the at least one IoT gateway [120] where the IoT device [130] may never have had a prior communication with the at least one IoT gateway [120].

A wireless network [160] (hereinafter also referred to as "network") may be set up to provide a user of an IoT device [130] (hereinafter also referred to as "access device") user with access to various devices connected to the network [160]. For example, a network [160] may include one or more IoT gateways [120] (hereinafter also referred to as "network devices") that provide a user with the ability to remotely configure or control the network devices themselves or one or more electronic devices or IoT devices [130](e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

The invention encompasses creation of a user account with login information on application, that is used to authenticate the user and allow access to the network devices.

For example, once an account is created, a user may enter the login information in order to access a network device in a logical network.

The invention also encompasses the use of an account-less authentication process that may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An account-less authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow account-less authentication, a cloud network server may provide a network ID and/or one or more keys to a network device and/or to the access device, (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

The invention also encompasses a home local area network that may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The onboarding server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform account-less authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Figure 2:
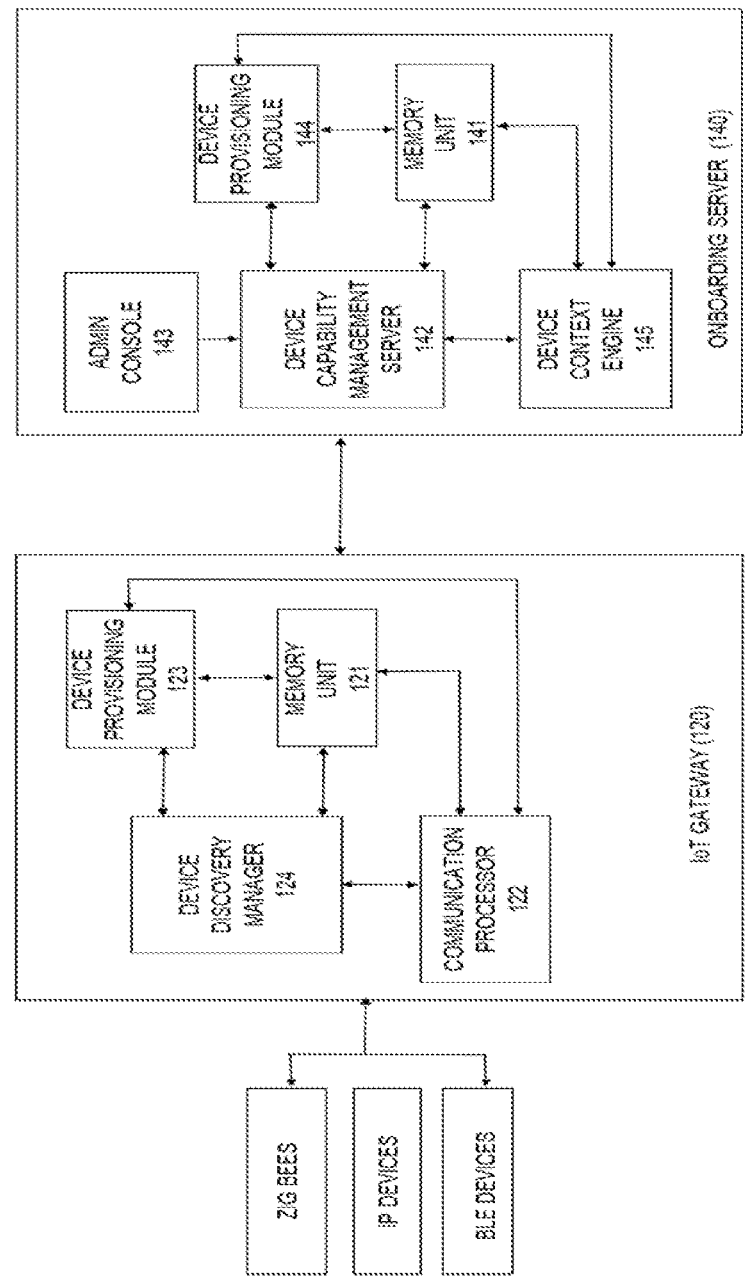
FIG. 2 illustrates an overall platform architecture of the system [100] for automatically provisioning a new IoT device to an IoT gateway via a wireless network, in accordance with an embodiment of the present disclosure.

Referring to FIG. 2, illustrates an overall platform architecture of the system [100] for automatically provisioning at least one new IoT device [130] to at least one IoT gateway [120] via a wireless network [160], in accordance with an embodiment of the present disclosure. The system comprises an onboarding server [140], at least one IoT gateway [120] and a wireless network [160].

The onboarding server [140] comprises a first memory unit [141], a device capability management server [142], and a first device provisioning module [144]. Although not shown explicitly in the figure, it may be presumed that the first memory unit [141], the device capability management server [142], and the first device provisioning module [144] are interconnected.

The device capability management server [142] is connected to the first memory unit [141]. The device capability management server [142] is configured to dynamically receive at least one new device model via an admin console [143], wherein the new device model comprises of a configuration setting and a model identifier corresponding to the at least one new IoT device [130].

The first device provisioning module [144] is connected to the first memory unit [141] and the device capability management server [142]. The first device provisioning module [144] is configured to receive a connection request from the at least one IoT gateway [120] via the wireless network [160]. The first device provisioning module [144] is further configured to establish a connection with the at least one IoT gateway [120] via the wireless network [160]. The first device provisioning module [144] is further configured to dynamically push the at least one new device model to the at least one IoT gateway [120] based on a successful connection with the at least one IoT gateway [120].

The onboarding server [140] may also comprise an admin console [143], a device context engine [145], a rule engine [146] (not shown in FIG. 1), a DB interface [147] (not shown in FIG. 1), an event processor [148] (not shown in FIG. 1), and a capability database [149] (not shown in FIG. 1).

The admin console [143] is configured to act as an interface for the device capability management server [142], such that the device capability management server [142] dynamically receives the at least one new device model via the admin console [143].

The device context engine [145] is connected to the first memory unit [141], the device capability management server [142] and the first device provisioning module [144], and to other constituent components of the onboarding server [140]. The device context engine [145] is configured to automatically define at least one rule for the at least one new device model received at the onboarding server [140]. The device context engine [145] is described in further detail below with reference to FIG. 9.

The device context engine [145] is also configured to dynamically push the at least one rule corresponding to the at least one new device model to the first device provisioning module [144]. The device context engine [145] may further be configured to manage dynamic state of the at least one new IoT device [120], and aid in deriving automatic rules based on new IoT device capabilities.

The rule engine [146] is configured to automatically define new rules based on dynamic event correlations. For instance, for a new streamer device added to the network, the rule engine defines the rule to push an alert to switch on streamer when smoke is detected. Thus, at run time device context engine [145] interfaces with rule engine [146] to enable triggering rules. The event processor [148] is configured to processes dynamic events from the new IoT devices and trigger alerts thereof. The invention also encompasses automatic definition of new rules based on the usage history of other devices associated with the user account. In an example, a user may have a smartwatch connected to its user profile of IoT devices wherein there may be an alarm set for 6 AM every day. When a new IoT device model such as for a smart geyser is added to the device provisioning module [144], the rule engine [146] may based on this information generate new rules associated with the device model of the new smart geyser using which the geyser is caused to automatically turn on at 5:30 AM.

The capability database [149] is a database to store the at least one new device model received at the device capability management server [142] via the admin console [143]. The capability database [149] is further configured to update new device capabilities along with attributes and provides data to other server interfaces. The DB interface [147] acts as an interface configured to store any new device model and the same is updated in the capability database [149] with all the device attributes information.

For instance, the new device model may also comprise device details, attributes, capabilities and category as illustrated below in Table 1:

| Device | Attributes | Capabilities | Category |
|---|---|---|---|
| Baby Monitoring Camera | status: online/offline attributes: name: Crydetected type: ENUM values: 'off' 'on' | commands: "start streaming': arguments: [ ] 'on': arguments: [ ] | Baby Monitoring |
| Wearable | attributes: name: StepCount type: INT name: BP Value type: INT name: Heart rate type: INT | commands: "Sync Steps data': arguments: [ ] | Fitness and Health |
| Baby Monitoring Camera | status: online/offline attributes: name: Crydetected type: ENUM values: 'off' 'on' | commands: "start streaming': arguments: [ ] 'on': arguments: [ ] | Baby Monitoring |
| Wearable | attributes: name: StepCount name: BP Value type: INT name: Heart rate type: INT | commands: "Sync Steps data': arguments: [ ] | Fitness and Health |
| Baby Monitoring Camera | status: online/offline attributes: name: Crydetected type: ENUM values: 'off' 'on' | commands: "start streaming': arguments: [ ] 'on': arguments: [ ] | Baby Monitoring |
| Wearable | attributes: name: StepCount type: INT name: BP Value type: INT name: Heart rate type: INT | commands: "Sync Steps data': arguments: [ ] | Fitness and Health |

The at least one IoT gateway [120] comprises a second memory unit [121], a communication processor [122], a second device provisioning module [123] and a device discovery manager [124]. Although not shown explicitly in the figure, it may be presumed that the first memory unit [141], the device capability management server [142], and the first device provisioning module [144] are interconnected.

The communication processor [122] is connected to the second memory unit [121]. The communication processor [122] is configured to transmit a connection request to the onboarding server [140] via the wireless network [160], said connection request is a request to establish a connection between the IoT gateway [120] and onboarding server [140]. The communication processor [122] is further configured to establish a connection with the onboarding server [140] via the wireless network [160].

The second device provisioning module [123] is connected to the second memory unit [121] and the communication processor [122]. The second device provisioning module [123] is configured to dynamically receive the at least one new device model from the onboarding server [140] based on a successful connection with the onboarding server [140]. By receiving such device models, the IoT gateway [120] becomes enriched with the capability to be able to connect new IoT device corresponding to such device models when the user wishes to do so.

The device discovery manager [124] is connected to the second memory unit [121], the communication processor [122] and the second device provisioning module [123]. The device discovery manager [124] is configured to receive a registration request from a first IoT device [180] via the wireless network [160], wherein the registration request comprises a model identifier of the first IoT device [180]. The device discovery manager [124] is further configured to process the received registration request to identify a configuration setting associated with said first IoT device [180] based on the model identifier of the first IoT device [180]. The device discovery manager [124] is further configured to provision a permanent connection between the at least one IoT gateway [120] and the first IoT device [180] using the identified configuration setting of the first IoT device [180]. Thus, the device discovery manager [124] is configured to handle device discovery process, and any new device model information discovered during discovery shall be updated based on dynamic updates on onboarding server.

Figure 3:
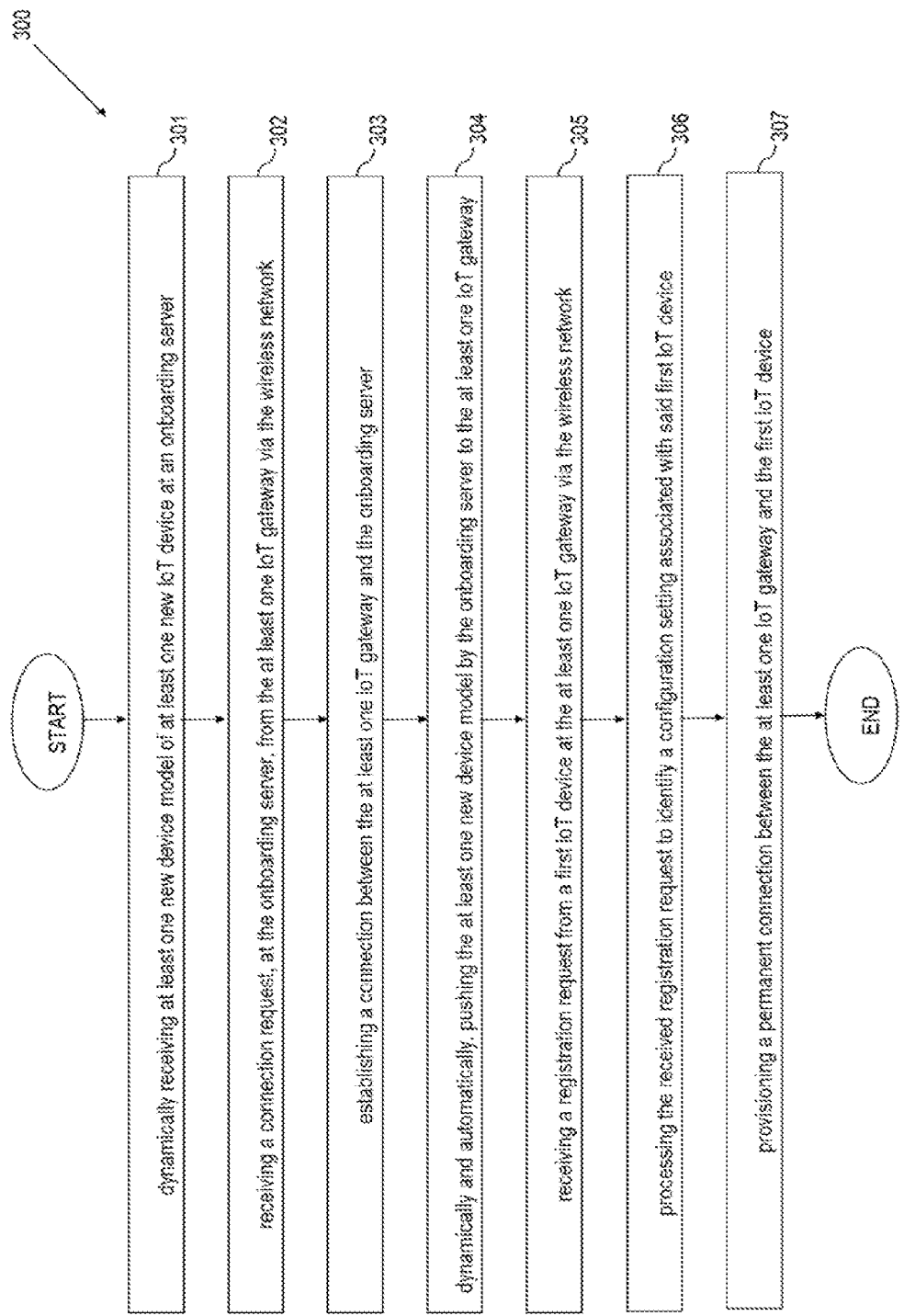
FIG. 3 illustrates an exemplary method flow diagram depicting method for automatically provisioning at least one new IoT device to at least one IoT gateway via a wireless network, in accordance with exemplary embodiments of the present disclosure.

As illustrated in FIG. 3, the present invention illustrates an exemplary method flow diagram depicting method for automatically provisioning at least one new IoT device to at least one IoT gateway via a wireless network, in accordance with exemplary embodiments of the present disclosure.

The method flow initiates at 301 with the onboarding server [140] dynamically receiving at least one new device model of at least one new IoT device [130], wherein the new device model comprises of a configuration setting and a model identifier corresponding to the at least one new IoT device [130]. This at least one new device model may be received at the onboarding server [140] via an admin console [143] or a web application. In an embodiment, the new device models for new IoT devices are received periodically, wherein the period of update may be fixed by the administrator or the user. The invention encompasses dynamically receiving device models for only white-listed IoT devices.

For instance, when a new IoT device such as a new smart fire alarm, is introduced or launched in the market, the device model of said new IoT device [130] may be added to the onboarding server [140] by the administrator of the IoT subsystem. The device model of this new smart fire alarm may include a model identifier '789'. In an exemplary embodiment, table 2 below shows a list of new device models received at the onboarding server [140]. It will be appreciated that although numeric model identifiers are provided below as examples, any other type of identifiers such as alphanumeric model identifiers may be used.

TABLE 2

| IoT device type | Model Identifier | Configuration Setting |
|---|---|---|
| Smart Fire Alarm | 789 | C-789 |
| Baby Monitoring Camera | 352 | C-352 |

Subsequently, at step 302, a connection request is received, at the onboarding server [140], from the at least one IoT gateway [120] via the wireless network [160]. At step 303, a connection is established between the at least one IoT gateway [120] and the onboarding server [140] via the wireless network [160]. The step of establishing a connection between the at least one IoT gateway [120] and the onboarding server [140] may further comprise synchronizing at least one network identifier of the at least one IoT gateway [120] with the onboarding server [140]. A person skilled in the art would appreciate that step 302 and 301 may not be sequential, and that step 302 may occur at a much later instance of time. Further, in an embodiment, the request to establish a connection may be sent by the onboarding server [140] to the IoT gateway [120].

Further, at step 304, the onboarding server [140] dynamically pushes the at least one new device model to the at least one IoT gateway [120] based on a successful connection between the at least one IoT gateway [120] and the onboarding server [140]. Additionally, the at least one IoT gateway [120] may store the at least one new device model received from the onboarding server [140] in a database stored in the memory unit [121]. Accordingly, the at least one IoT gateway [120] may dynamically update its database with the at least one new device model received from the onboarding server [140] upon successful connection between the at least one IoT gateway [120] and the onboarding server [140]. It is pertinent to note that this step occurs in the background while the services of the existing IoT devices that are already connected with the IoT gateway [120] are not disrupted.

At step 305, a registration request is received from a first IoT device [180] at the at least one IoT gateway [120] via the wireless network [160]. The registration request comprises at least a model identifier of the first IoT device [180]. The registration request may also comprise of a unique device ID of the first IoT device [180]. A person skilled in the art would appreciate that step 304 and 305 may not be sequential, and that step 205 may occur at a much later instance of time. For instance, a user may buy a new first IoT device such as the new smart fire alarm, and may try to connect this device to its existing IoT network of devices. When the user tries to connect this new device, a registration request is sent from the new smart fire alarm to the home gateway (IoT gateway [120]). This registration request includes the model identifier 789 as well as the device ID 7575 of the smart fire alarm. A particular IoT device typically has a unique model identifier that is common for all the IoT devices of the same model; and the IoT device also has a unique device ID that is unique irrespective of the uniqueness of the model or type of the IoT device. In an exemplary embodiment, table 3 below shows a list of first IoT device for which registration request is received at the IoT gateway [120]. It will be appreciated that although numeric model identifiers and device ID are provided below as examples, any other type of identifiers such as alphanumeric model identifiers and device ID may be used.

TABLE 3

| IoT device type | Unique Device ID | Model Identifier |
|---|---|---|
| Smart Fire Alarm | 7575 | 789 |

Next, at step 306, the at least one IoT gateway [120] processes the received registration request to identify a configuration setting associated with said first IoT device [180] based on the model identifier of the first IoT device [180]. While processing received registration request, at least one IoT gateway [120] may compare the model identifier of the first IoT device [180] with the model identifier corresponding to the at least one new IoT device [130] stored in the database at the at least one IoT gateway [120]. For instance, when the user tries to register the smart fire alarm having model identifier 789, the IoT gateway [120] may compare the model identifier of the smart fire alarm with the model identifiers stored in the database at step 304 and also identify the configuration settings associated with said model identifier. For instance, in this example, the configuration setting C-789 is identified for the smart fire alarm having a unique device ID 7575 and model identifier 789.

Lastly, at step 307, the at least one IoT gateway [120] provisions a permanent connection between the at least one IoT gateway [120] and the first IoT device [180] using the identified configuration setting of the first IoT device [180].

Figure 4:
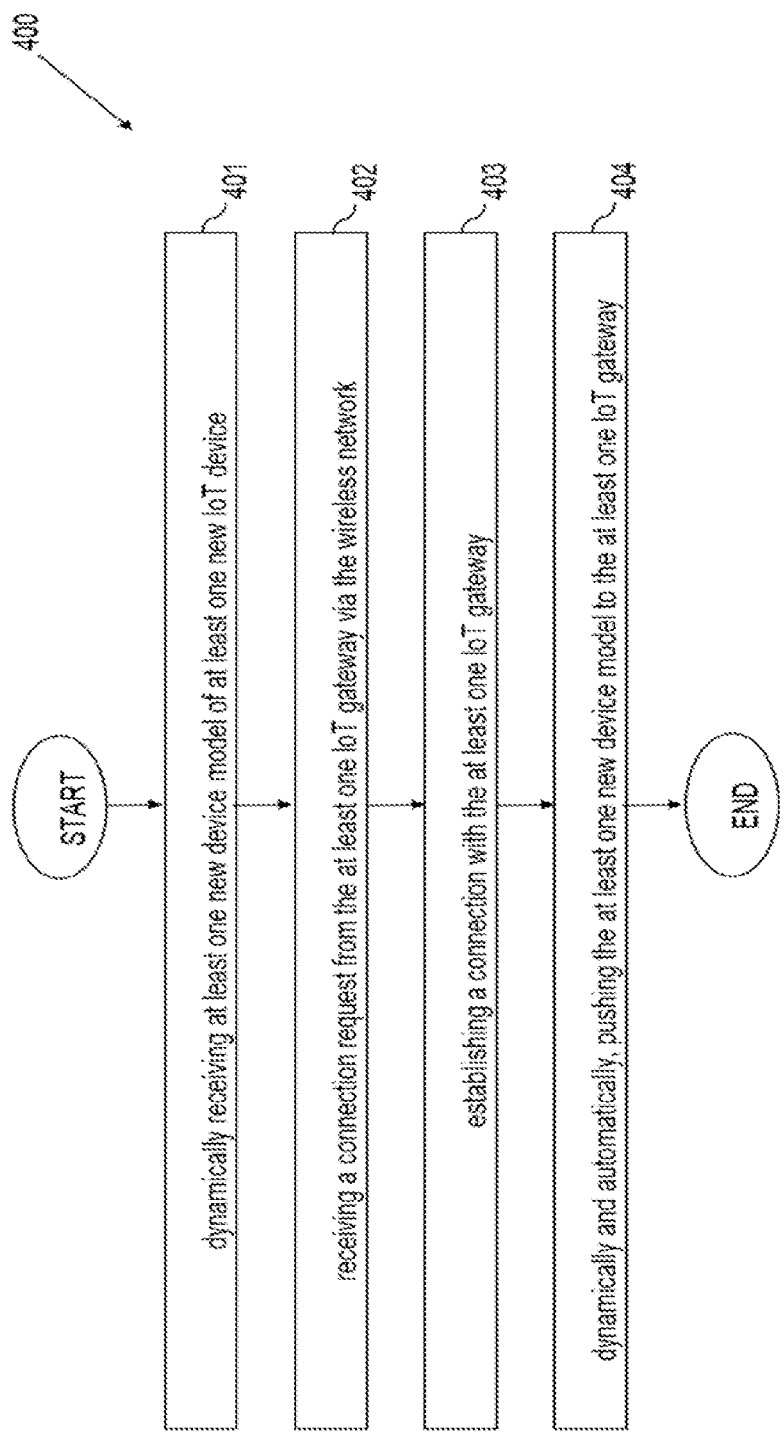
FIG. 4 illustrates an exemplary method flow diagram depicting method for automatically provisioning at least one new IoT device to at least one IoT gateway via a wireless network, the method being performed by an onboarding server, in accordance with exemplary embodiments of the present disclosure.

As illustrated in FIG. 4, the present invention further encompasses a method for automatically provisioning at least one new IoT device [130] to at least one IoT gateway [120] via a wireless network [160], the method being performed by an onboarding server [140], in accordance with exemplary embodiments of the present disclosure.

The method flow initiates at step 401 with the onboarding server [140] dynamically receiving at least one new device model of at least one new IoT device [130]. The new device model may at least comprise a configuration setting and a model identifier corresponding to the at least one new IoT device [130].

At step 402, a connection request is received from the at least one IoT gateway [120] via the wireless network [160], and at step 403, a connection is established between the at least one IoT gateway [120] and the onboarding server [140] via the wireless network [160].

Lastly at step 404, the onboarding server [140] dynamically pushes the at least one new device model to the at least one IoT gateway [120] based on a successful connection between the at least one IoT gateway [120] and the onboarding server [140].

Figure 5:
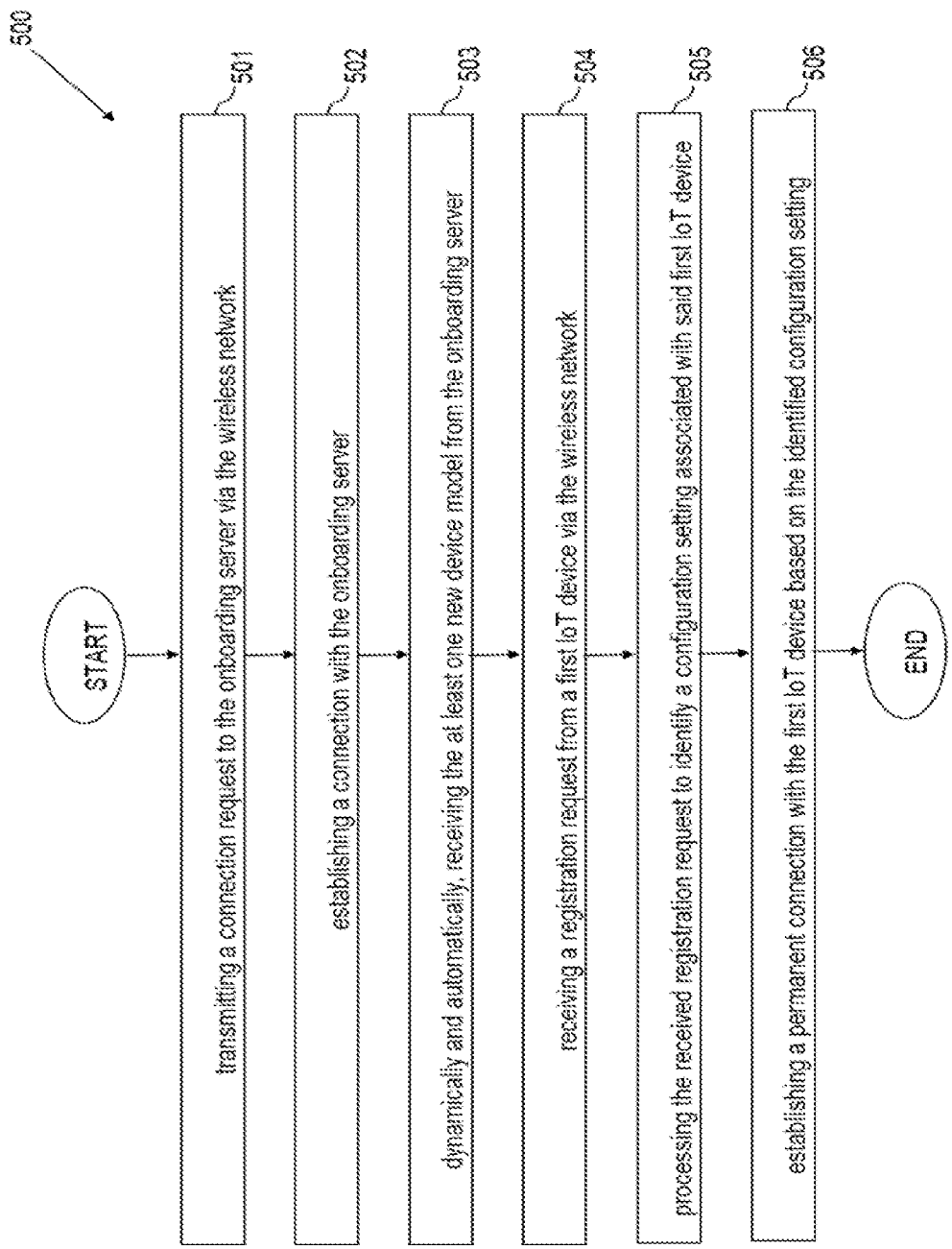
FIG. 5 illustrates an exemplary method flow diagram depicting method for automatically provisioning at least one new IoT device to at least one IoT gateway via a wireless network, the method being performed by an IoT gateway, in accordance with exemplary embodiments of the present disclosure.

As illustrated in FIG. 5, the present invention further encompasses a method for automatically provisioning at least one new IoT device [130] to at least one IoT gateway [120] via a wireless network [160], the method being performed by the at least one IoT gateway [120], in accordance with exemplary embodiments of the present disclosure.

The method flow initiates at 501 with the at least one IoT gateway [120] transmitting a connection request to an onboarding server [140] via the wireless network [160]. At step 502, a connection is established between the at least one IoT gateway [120] and the onboarding server [140] via the wireless network [160].

Upon a successful connection, at step 503, the at least one IoT gateway [120] dynamically receives at least one new device model of at least one new IoT device [130] from the onboarding server [140]. The new device model comprises of a configuration setting and a model identifier corresponding to the at least one new IoT device [130].

At step 504, a registration request is received from a first IoT device [180] via the wireless network [160], wherein the registration request comprises at least a model identifier of the first IoT device [180]. A user may log in to an application to provision new IoT devices. The application then initiates discovery of new IoT devices (e.g., sensors) or access points (e.g., gateways) on the local network (e.g., Zigbee/Zwave/Wi-Fi). Subsequently, the user selects a first new IoT device that he wishes to associate and initiates device registration process. As part of device provisioning unique device details (e.g., RSN, UUID, etc) corresponding to the first new IoT device is shared with the onboarding server [140]. Upon successful authentication, the system [100] issues to the new IoT device a unique identity, referred to as a device ID. Accordingly, this device ID may be used by the new IoT device and may act as device identity for any further communication with the onboarding server [140].

At step 505, the received registration request is processed to identify a configuration setting associated with said first IoT device [180] based on the model identifier of the first IoT device [180]. While processing received registration request, at least one IoT gateway [120] may compare the model identifier of the first IoT device [180] with the model identifier corresponding to the at least one new IoT device [130] stored in the database at the at least one IoT gateway [120].

Lastly at step 506, the at least one IoT gateway [120] provisions a permanent connection with the first IoT device [180] using the identified configuration setting of the first IoT device [180], thereby connecting the at least one new IoT device [130] to at least one IoT gateway [120].

Figure 6:
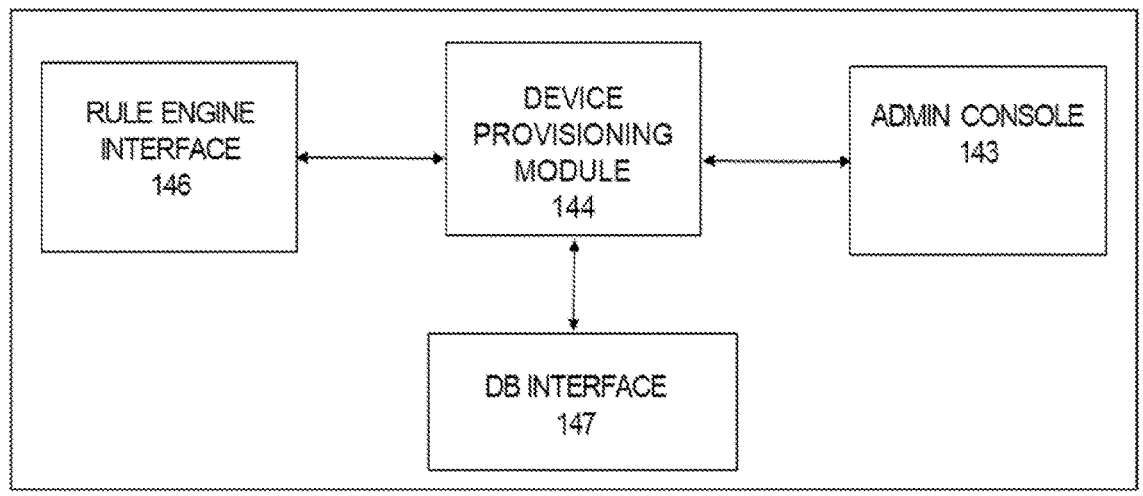
FIG. 6 illustrates an exemplary device provisioning module at the onboarding server, in accordance with an embodiment of the present disclosure.

Referring to FIG. 6, illustrates an exemplary device provisioning module [144] at the onboarding server [140], in accordance with an embodiment of the present disclosure. The device provisioning module [144] is connected to the rule engine [146], the admin console [143] and DB interface [147]. The device provisioning module [144] interfaces with the rule engine [146], the admin console [143] and DB interface [147].

The admin console [143] is configured to act as interface for the device capability management server [142], such that the device capability management server [142] dynamically receives the at least one new device model via the admin console [143]. The rule engine [146] is configured to automatically define new rules based on dynamic event correlations. For instance, for a new smoke detector device added to the network, the rule engine defines the rule to push an alert to switch on smoke detector when smoke is detected. At run time, device context engine [145] interfaces with rule engine [146] to enable triggering rules. The event processor [148] is configured to processes dynamic events from the new IoT devices and trigger alerts thereof.

Figure 7:
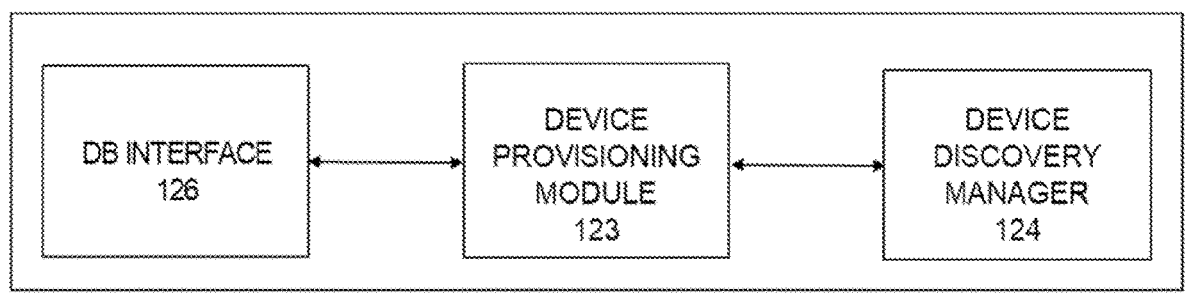
FIG. 7 illustrates an exemplary device provisioning module at the IoT gateway, in accordance with an embodiment of the present invention.

Referring to FIG. 7, illustrates an exemplary device provisioning module at the IoT gateway, in accordance with an embodiment of the present invention. The device provisioning module [123] at the IoT gateway [120] interfaces with the DB Interface [126] and the device discovery manager [124]. The DB interface [126] is configured to store and provide any new device models received from the onboarding server [140]. The DB interface [126] is also configured to store and provide the attributes, capabilities and categories associated with said device models.

Figure 8:
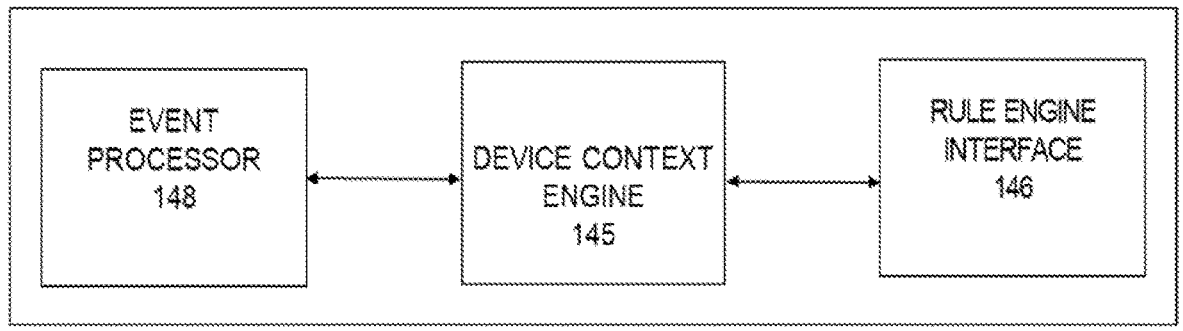
FIG. 8 illustrates an exemplary device context engine at the onboarding server, in accordance with an embodiment of the present disclosure.

Referring to FIG. 8, illustrates an exemplary device context engine at the onboarding server, in accordance with an embodiment of the present disclosure. The device context engine [145] is connected to the first memory unit [141], the device capability management server [142], the first device provisioning module [144], the rule engine [146] and event processor [148]. The device context engine [145] at the onboarding server [140] also interfaces with the rule engine [146] and event processor [148].

The rule engine [146] is configured to automatically define new rules based on dynamic event correlations. For instance, for a new smoke detector device added to the network, the rule engine defines the rule to push an alert to switch on smoke detector when smoke is detected. Thus, at run time device context engine [145] interfaces with rule engine [146] to enable triggering rules. The event processor [148] is configured to processes dynamic events from the new IoT devices and trigger alerts thereof.

The present invention also encompasses procedure for managing device context at the device context engine [145]. The device context engine [145] is configured to manage dynamic state of each IoT device connected to the onboarding server [140] as well as the new IoT devices. The device context engine [145] is further configured to derive automatic rules for the new IoT devices based on the new device capabilities, where the device capability information may be contained in the new device model. Lastly, at run time the device context engine [145] interfaces with rule engine [146] to enable rule triggers.

Figure 9:
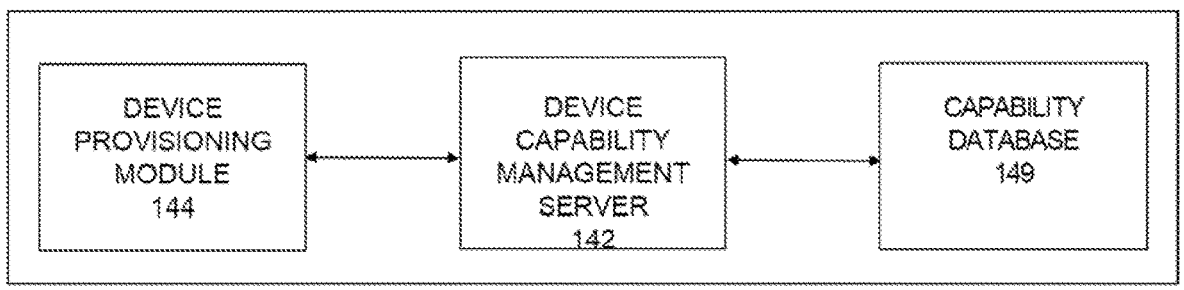
FIG. 9 illustrates an exemplary device capability management server at the onboarding server, in accordance with an embodiment of the present disclosure.

Referring to FIG. 9 illustrates an exemplary device capability management server at the onboarding server, in accordance with an embodiment of the present disclosure. The device capability management server [142] is connected to the memory unit [141], device provisioning module [144], the device context engine [145], the rule engine [146], the DB interface [147], the event processor [148], and the capability database [149]. The device capability management server [142] also interfaces with the device provisioning module [144] and the capability database [149]. The device capability management server [142] manages new device capabilities and the new device attributes as known from the new device model.

The present invention encompasses method for managing new device capabilities at the device capability management server [142]. The device capability management server [142] manages new device capabilities and the new device attributes as known from the new device model. Thereafter, the new device model with necessary attributes are added in the device capability management server [142] prior to device launch in the market. Subsequently, when a user logs in to an application to provision a new IoT device, the application initiates discovery of new IoT devices (e.g., Zigbee/Zwave/Wi-FI sensors) or IoT gateways (e.g., gateways) on the wireless network.

Figure 10:
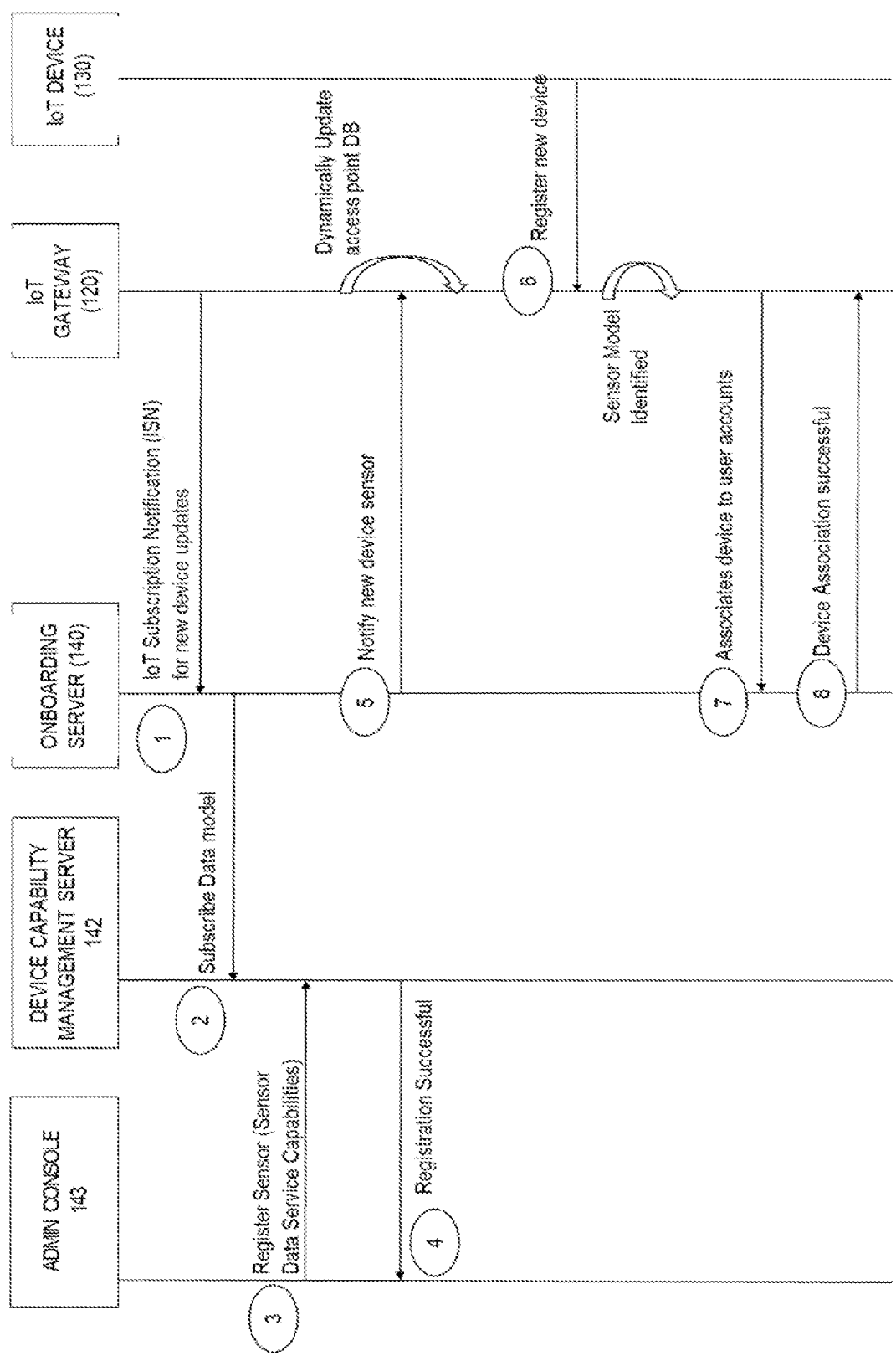
FIG. 10 illustrates an exemplary call flow diagram for dynamic provisioning of new device models, in accordance with an embodiment of the present disclosure.

Referring to FIG. 10 illustrates an exemplary call flow diagram for dynamic provisioning of new device models, in accordance with an embodiment of the present disclosure. Accordingly, the present invention encompasses a method for dynamic provisioning of new device models for the system [100].

The method flow initiates at step 1 when an IoT gateway [120] applies for IoT Subscription Notification (ISN) for new device updates to the onboarding server [140]. At step 2, the onboarding server [140] requests for subscription for new device models. Subsequently, at step 3, the onboarding server [140] registers new device model. The new device model may comprise a configuration setting, device capabilities, device attributes and a model identifier corresponding to the at least one new IoT device. Accordingly, at step 5, the onboarding server [140] notifies successful recognition of the new device model to the access point [120]. The database at the IoT gateway is dynamically updated in the background with the new device models received from the onboarding server [140], thus, saving user from any down time.

At a later time, at step 6, an IoT device [130] establishes a connection with the IoT gateway [120]. At step 7, the method further involves associating the new IoT device to a users' account. Lastly, at step 8, the device association is successful and the new IoT device can avail the services over the wireless network.

Figure 11:
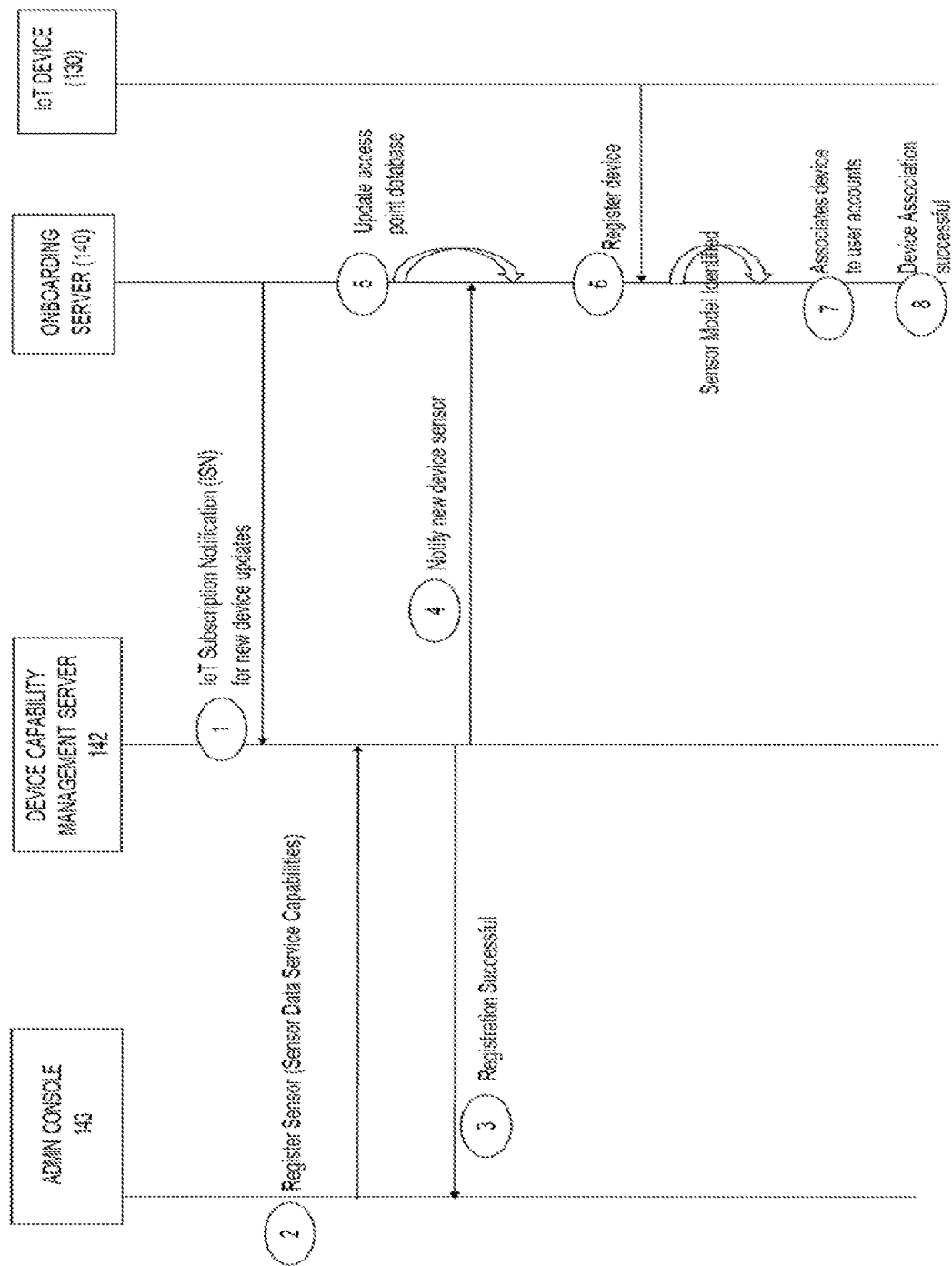
FIG. 11 illustrates an exemplary call flow diagram for dynamic provisioning of new device models (hub-less), in accordance with an embodiment of the present invention.

Referring to FIG. 11 illustrates an exemplary call flow diagram for dynamic provisioning of new device models (hub-less), in accordance with an embodiment of the present invention. Accordingly, the present invention encompasses a method for dynamic provisioning of new device models for the hub-less system [100].

In a hub-less system, the new IoT device is directly connected to the onboarding server [140]. Accordingly, the method flow initiates at step 1 when the onboarding server [140] applies for IoT Subscription Notification (ISN) for new device updates. Consequently, at steps 2 and 3, the onboarding server [140] successfully registers new device model. The new device model may comprise a configuration setting, device capabilities, device attributes and a model identifier corresponding to the at least one new IoT device.

Accordingly, at step 4, the onboarding server [140] is notified about the successful registration of the new device model. At step 5, the database at the onboarding server [140] is dynamically updated in the background with the new device models received at the onboarding server [140], thus, saving the user from any downtime.

At a later time, when an IoT device [130] establishes a connection with the onboarding server [140], at step 6. At step 7, the method further involves associating the new IoT device to a users' account. Lastly, at step 8 the device association is successful and the new IoT device [130] can avail the services over wireless network.

Thus, the present invention achieves the objectives of the Gateway automatically subscribing to new device model updated from the onboarding server which pushes new updates to the Gateways as and when new models are added and the Gateway updates its local device database. The present invention also achieves the objective of the Gateway associating the new IoT device model to user accounts without any user intervention or confirmation.

The interface, module, memory, database, processor and component depicted in the figures and described herein may be present in the form of a hardware, a software and a combination thereof. The connection shown between these components/module/interface in the system [100] are exemplary and any components/module/interface in the system [100] may interact with each other through various logical links and/or physical links. Further, the components/module/interface may be connected in other possible ways.

Though a limited number of the onboarding server [140], the IoT gateway [120], the IoT device [130], the wireless network [160], interface, module, memory, database, processor and component, have been shown in the figures; however, it will be appreciated by those skilled in the art that the overall system [100] of the present invention encompasses any number and varied types of the entities/elements such as the onboarding server [140], the IoT gateway [120], the IoT device [130], the wireless network [160], interface, module, memory, database, processor and component.

While considerable emphasis has been placed herein on the disclosed embodiments, it will be appreciated that many embodiments can be made and that many changes can be made to the embodiments without departing from the principles of the present invention.

These and other changes in the embodiments of the present invention will be apparent to those skilled in the art, whereby it is to be understood that the foregoing descriptive matter to be implemented is illustrative and non-limiting.

We claim:

1. A method for automatically provisioning at least one new IoT device to at least one IoT gateway via a wireless network, the method comprising:
    dynamically receiving at least one new device model of at least one new IoT device at an onboarding server, wherein the new device model comprises at least of a configuration setting and a model identifier corresponding to the at least one new IoT device;
    receiving a connection request, at the onboarding server, from at least one IoT gateway via a wireless network;
    establishing a connection between the at least one IoT gateway and the onboarding server via the wireless network;
    dynamically pushing the at least one new device model by the onboarding server to the at least one IoT gateway based on a successful connection between the at least one IoT gateway and the onboarding server;
    receiving a registration request from a first IoT device at the at least one IoT gateway via the wireless network, wherein the registration request comprises at least a model identifier of the first IoT device;
    processing the received registration request to identify a configuration setting associated with said first IoT device based on the model identifier of the first IoT device; and
    provisioning a permanent connection between the at least one IoT gateway and the first IoT device using the identified configuration setting of the first IoT device thereby connecting the first new IoT device to the IoT gateway.

2. The method as claimed in claim 1, wherein establishing a connection between the at least one IoT gateway and the onboarding server further comprises synchronizing at least one network identifier of the at least one IoT gateway with the onboarding server.

3. The method as claimed in claim 1, further comprising:
    storing, in a database at the at least one IoT gateway, the at least one new device model received from the onboarding server; and
    dynamically updating the database, at the at least one IoT gateway, with the at least one new device model received from the onboarding server.

4. The method as claimed in claim 3, wherein processing the received registration request to identify a configuration setting associated with said first IoT device further comprises comparing the model identifier of the first IoT device with the model identifier corresponding to the at least one new IoT device, stored in the database at the at least one IoT gateway.

5. The method as claimed in claim 1, further comprising:
    automatically defining at least one rule for the at least one new device model at the onboarding server; and
    dynamically pushing the at least one rule corresponding to the at least one new device model from the onboarding server to the at least one IoT gateway based on a successful connection between the at least one IoT gateway and the onboarding server.

6. A system for automatically provisioning at least one new IoT device to at least one IoT gateway over at least one wireless network, the system comprising:
    an onboarding server comprising:
        a first memory unit;
        a device capability management server connected to the first memory unit, said device capability management server configured to dynamically receive at least one new device model via an admin console, wherein the new device model comprises at least of a configuration setting and a model identifier corresponding to at least one new IoT device;
        a first device provisioning module connected to the first memory unit and the device capability management server, said first device provisioning module configured to:
            receive a connection request from at least one IoT gateway via a wireless network;
            establish a connection with the at least one IoT gateway via the wireless network; and
            dynamically, push the at least one new device model to the at least one IoT gateway based on a successful connection with the at least one IoT gateway; and
    the at least one IoT gateway comprising:
        a second memory unit;
        a communication processor connected to the second memory unit, said communication processor configured to:
            transmit a connection request to the onboarding server via the wireless network;
            establish a connection with the onboarding server via the wireless network;
        a second device provisioning module connected to the second memory unit and the communication processor, said second device provisioning module configured to dynamically receive the at least one new device model from the onboarding server based on a successful connection with the onboarding server;
        a device discovery manager connected to the second memory unit, the communication processor and the second device provisioning module, said device discovery manager configured to:
            receive a registration request from a first IoT device via the wireless network, wherein the registration request comprises a model identifier of the first IoT device;
            process the received registration request to identify a configuration setting associated with said first IoT device based on the model identifier of the first IoT device; and
            provision a permanent connection between the at least one IoT gateway and the first IoT device using the identified configuration setting of the first IoT device.

7. A method for automatically provisioning at least one new IoT device to at least one IoT gateway via a wireless network, the method being performed by an onboarding server, the method comprising:
    dynamically receiving at least one new device model of at least one new IoT device, wherein the new device model comprises at least of a configuration setting and a model identifier corresponding to the at least one new IoT device;

receiving a connection request from at least one IoT gateway via a wireless network;

establishing a connection with the at least one IoT gateway via the wireless network; and dynamically pushing the at least one new device model to the at least one IoT gateway based on a successful connection with the at least one IoT gateway to provision a connection between the at least one IoT gateway and the at least one new IoT device.

8. An onboarding server for automatically provisioning at least one new IoT device to at least one IoT gateway via a wireless network, the onboarding server comprising:

a first memory unit;

a device capability management server connected to the first memory unit, said device capability management server configured to dynamically receive at least one new device model via an admin console, wherein the new device model comprises at least of configuration setting corresponding to at least one new IoT device; and a first device provisioning module connected to the first memory unit and the device capability management server, said first device provisioning module configured to:

receive a connection request from at least one IoT gateway via a wireless network;

establish a connection with the at least one IoT gateway; and dynamically push the at least one new device model to the at least one IoT gateway based on a successful connection with the at least one IoT gateway to provision a connection between the at least one IoT gateway and the at least one new IoT device.

9. The onboarding server as claimed in claim 8, further comprising a device context engine connected to the first memory unit, the device capability management server and the first device provisioning module, said device context engine configured to:

automatically define at least one rule for the at least one new device model received at the onboarding server; and dynamically push the at least one rule corresponding to the at least one new device model to the first device provisioning module.

10. The onboarding server as claimed in claim 9, wherein the first device provisioning module is further configured to dynamically push the at least one rule for the at least one new device model to the at least one IoT gateway based on a successful connection with the at least one IoT gateway.

11. A method for automatically provisioning at least one new IoT device to at least one IoT gateway via a wireless network, the method being performed by the at least one IoT gateway, the method comprising:

transmitting a connection request to an onboarding server via a wireless network;

establishing a connection with the onboarding server via the wireless network;

dynamically receiving at least one new device model of at least one new IoT device from the onboarding server, wherein the new device model comprises at least of a configuration setting and a model identifier corresponding to the at least one new IoT device;

receiving a registration request from a first IoT device, wherein the registration request comprises a configuration setting and a model identifier of the first IoT device;

processing the received registration request to identify a configuration setting associated with said first new IoT device based on the model identifier of the first IoT device; and dynamically provisioning a permanent connection between at least one IoT gateway and the first IoT device using the identified configuration setting of the first IoT device.

12. An IoT gateway for automatically provisioning with at least one new IoT device over a wireless network, the IoT gateway comprising:

a second memory unit;

a communication processor connected to the second memory unit, said communication processor configured to:

transmit a connection request to an onboarding server via a wireless network;

establish a connection with the onboarding server;

a second device provisioning module connected to the second memory unit and the communication processor, said second device provisioning module configured to dynamically receive at least one new device model from the onboarding server based on a successful connection with the onboarding server;

a device discovery manager connected to the second memory unit, the communication processor and the second device provisioning module, said device discovery manager configured to:

receive a registration request from a first IoT device via the wireless network, wherein the registration request comprises a model identifier of the first IoT device;

process the received registration request to identify a configuration setting associated with said first IoT device based on the model identifier of the first IoT device; and dynamically provision a permanent connection with the first IoT device using the identified configuration setting of the first IoT device.

13. The IoT gateway as claimed in claim 12, wherein the registration request is received from the first IoT device at the IoT gateway via a radio interface.

14. The system of claim 6, wherein the first device provisioning module is further configured to establish a connection between the at least one IoT gateway, and the onboarding server is further configured to synchronize at least one network identifier of the at least one IoT gateway with the onboarding server.

15. The system as claimed in claim 6, wherein the at least one IoT gateway stores, in a database, the at least one new device model received from the onboarding server, and dynamically updates the database with the at least one new device model received from the onboarding server.

16. The system of claim 15, wherein the device discovery manager is further configured to process the received registration request to identify a configuration setting associated with said first IoT device by comparing the model identifier of the first IoT device with the model identifier corresponding to the at least one new IoT device, stored in the database at the at least one IoT gateway.

17. The system of claim 6, wherein the onboarding server is further configured to automatically define at least one rule for the at least one new device model; and dynamically push the at least one rule corresponding to the at least one new device model from the onboarding server to the at least one IoT gateway based on a successful connection between the at least one IoT gateway and the onboarding server.

18. The system of claim 6, wherein the onboarding server further comprises a device context engine connected to the first memory unit, the device capability management server and the first device provisioning module, said device context engine configured to:

automatically define at least one rule for the at least one new device model received at the onboarding server; and dynamically push the at least one rule corresponding to the at least one new device model to the first device provisioning module.

19. The system of claim 18, wherein the first device provisioning module is further configured to dynamically push the at least one rule for the at least one new device model to the at least one IoT gateway based on a successful connection with the at least one IoT gateway.

20. The system of claim 6, wherein the at least one IoT gateway is further configured to receive a registration request from the first IoT device at the IoT gateway via a radio interface.

* * * * *